W. M. SCOTT.
SYSTEM OF REMOTE CONTROL.
APPLICATION FILED OCT. 7, 1907. RENEWED FEB. 17, 1913.

1,108,254.

Patented Aug. 25, 1914.
3 SHEETS—SHEET 1.

W. M. SCOTT.
SYSTEM OF REMOTE CONTROL.
APPLICATION FILED OCT. 7, 1907. RENEWED FEB. 17, 1913.

1,108,254.

Patented Aug. 25, 1914.
3 SHEETS—SHEET 2.

W. M. SCOTT.
SYSTEM OF REMOTE CONTROL.
APPLICATION FILED OCT. 7, 1907. RENEWED FEB. 17, 1913.

1,108,254.

Patented Aug. 25, 1914.

UNITED STATES PATENT OFFICE.

WILLIAM M. SCOTT, OF PHILADELPHIA, PENNSYLVANIA, ASSIGNOR TO THE CUTTER ELECTRICAL AND MANUFACTURING COMPANY, A CORPORATION OF NEW JERSEY.

SYSTEM OF REMOTE CONTROL.

1,108,254.  Specification of Letters Patent.  Patented Aug. 25, 1914.

Application filed October 7, 1907, Serial No. 396,265. Renewed February 17, 1913. Serial No. 749,030.

*To all whom it may concern:*

Be it known that I, WILLIAM M. SCOTT, a citizen of the United States, residing at Philadelphia, in the county of Philadelphia, State of Pennsylvania, have invented a new and useful System of Remote Control, of which the following is a specification.

My invention relates to circuit controlling mechanism and to a system in which a circuit breaker or circuit breakers is or are moved to circuit closing position by a motor, the breaker or breakers being adapted to be tripped either automatically or at the will of an operator, the opening movement of the breaker or breakers being independent of either actuation or control by the motor. The motor may be started, preferably from a remote point, and after having started the apparatus automatically retains the motor circuit closed independent of the circuit or apparatus which instituted the starting of the motor, the motor moving the breaker or breakers to full circuit closing position, the motor being then automatically stopped. The circuit breaker or breakers may be tripped at the will of an operator at a remote station, a single conductor serving to either start the motor as aforesaid, or to trip the breaker or breakers at will.

My invention resides also in structural features for carrying out the purposes aforementioned, as will be hereinafter described and pointed out in the claims.

Figure 1:
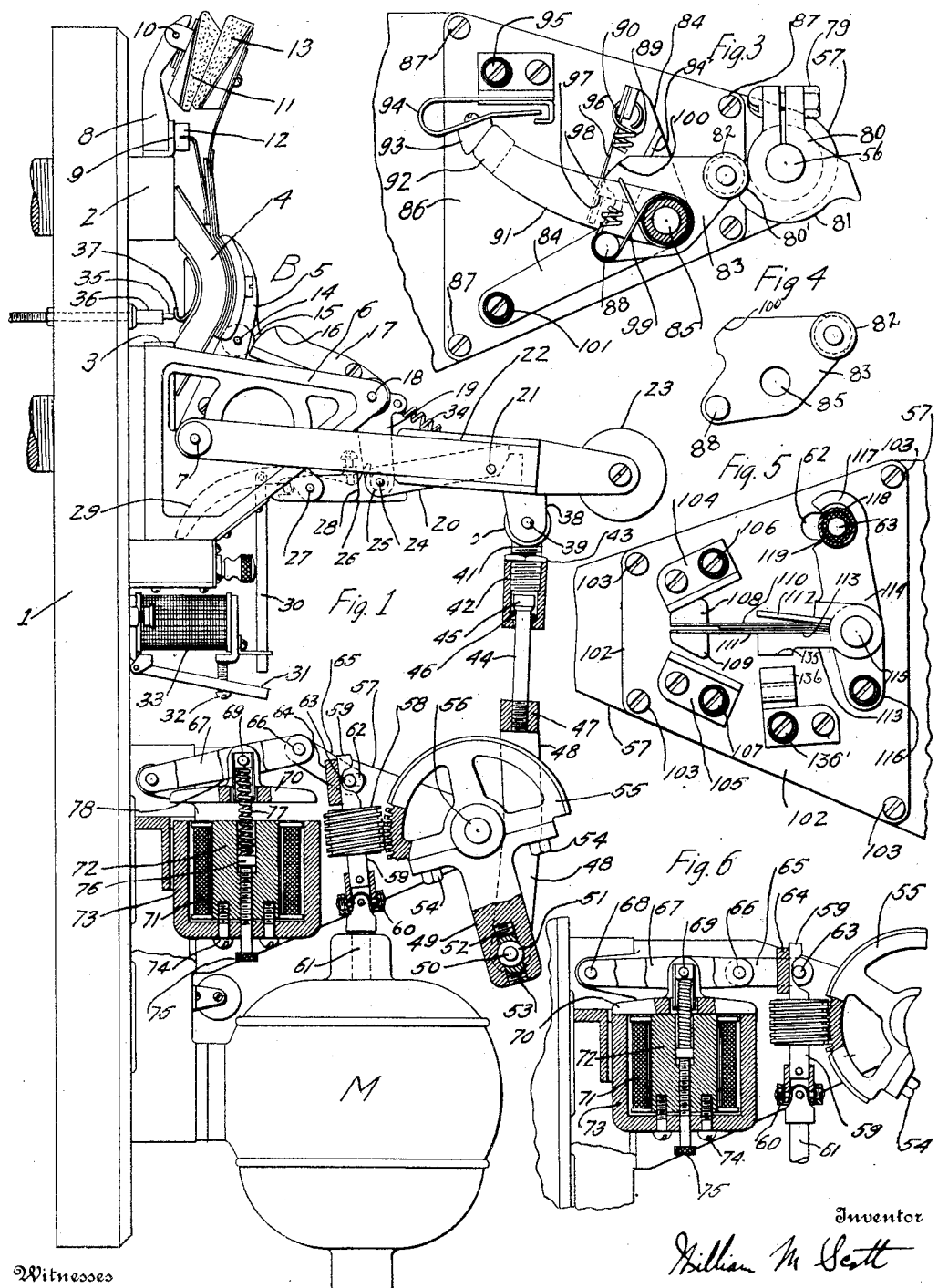
Figure 2:
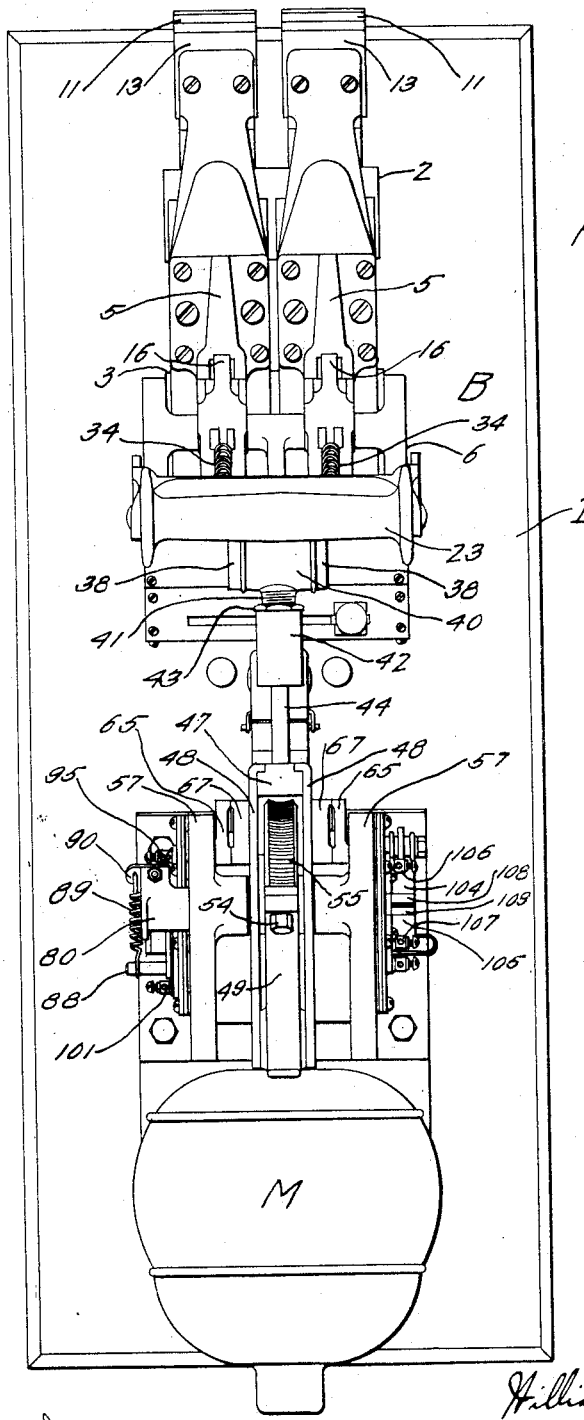
Figure 7:
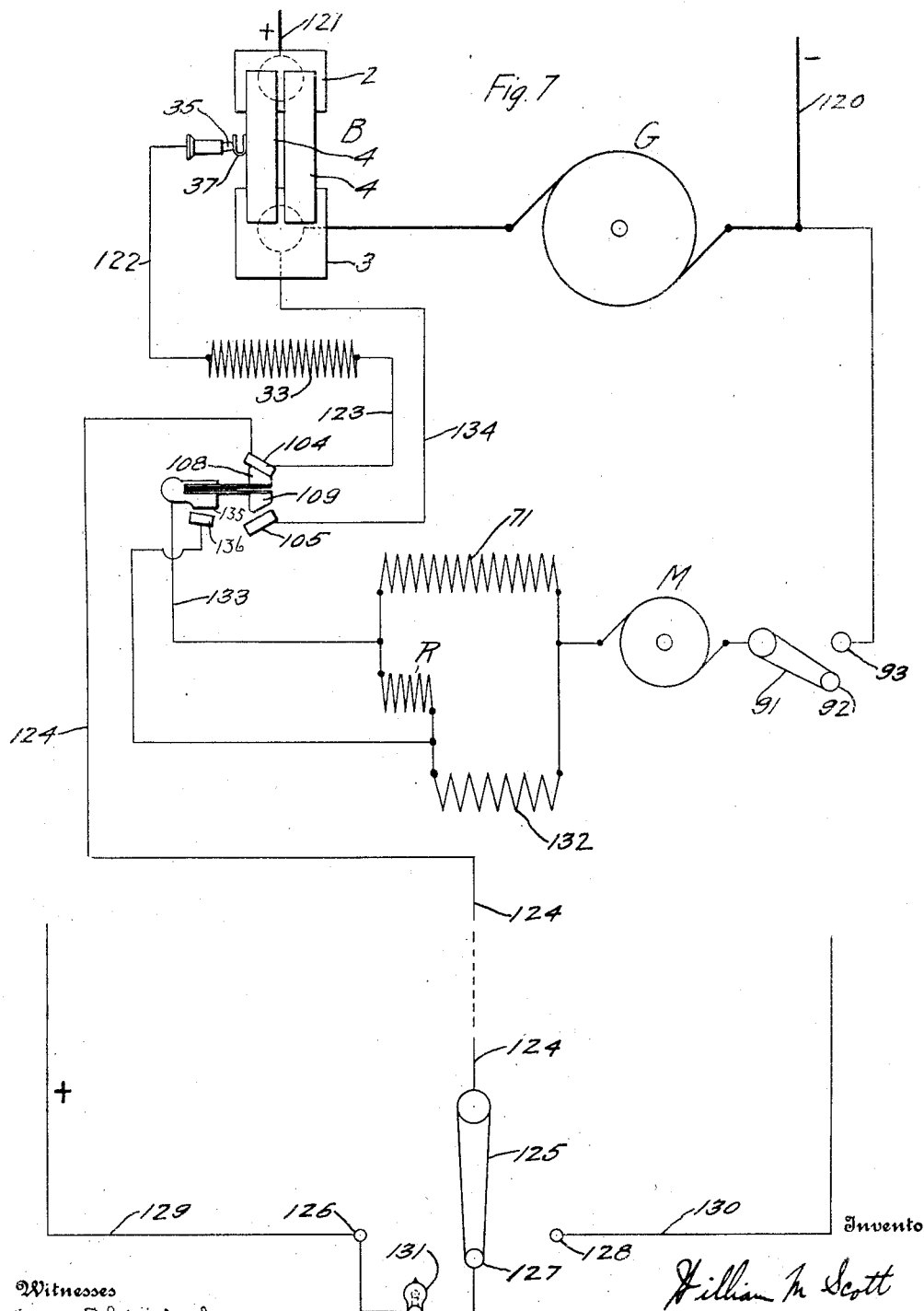

For an illustration of one of the forms my invention may take, reference is to be had to the accompanying drawings, in which:

Figure 1 is a side elevational view of the breaker or breakers and the operating motor, portions being shown in section. Fig. 2 is a front elevation of the same. Fig. 3 is a side elevational view, partly in section, on larger scale than Fig. 1, showing the automatic single acting motor control switch. Fig. 4 is a side elevational view, on larger scale than Fig. 1, of a member of the switch shown in Fig. 3. Fig. 5 is a side elevational view, on larger scale than Fig. 1, of the automatically operating switch which insures the continuation of the operation of the motor after the motor has once been started. Fig. 6 is a side elevational view, partly in section, showing the worm shifted into engagement with the worm wheel. Fig. 7 is a diagram of the circuits and connections of one arrangement of my invention.

Referring to Fig. 1, a base 1, of suitable insulating material, such as slate, marble, etc., has mounted thereon one or more circuit breakers B adapted to be moved to circuit closing position by a motor M also mounted upon the base 1. Mounted upon the base 1 are the main terminal or contact blocks 2 and 3, of the circuit breaker, adapted to be bridged by the laminated contact member 4 which is mounted on, but insulated from, the arm 5 pivoted to the housing or bracket 6 at 7.

Mounted upon and in electrical communication with the upper terminal block 2 is the bracket 8 having at its lower portion the stationary metallic shunt contact 9 and pivoted at 10 at its top, the stationary shunt carbon piece 11. Coöperating with the metallic shunt contact piece 9 and the stationary carbon piece 11, respectively, are the movable metallic shunt contact piece 12 and the movable carbon shunt piece 13, the movable shunt contacts being resiliently supported by, but insulated from, the arm 5.

Pivoted in the arm 5 at 14 is the roller 15, with which engages the cam surface 16 upon the cam member 17 pivoted in the housing 6 at 18. The cam member 17 has an extension 19 beyond the pivot 18, and pivoted in the lower end of the extension 19 is a link 20 pivoted at 21 in the operating lever 22 which is in turn pivoted at 7 to the housing or bracket 6. At the outer end of the lever 22 is a handle 23 affording a suitable grip for an operator for manual operation of the circuit breaker. Pivoted at 24, in the extension 19, is a roller 25 which is embraced or caught by the latch 26 pivoted at 27 in the housing 6, said latch serving to hold the parts in circuit closing position as shown. A latch actuating lever 28 is also pivoted at 27 and has a rearwardly extending tail 29 which extends into the path of upward travel of the armature of an overload tripping device, well understood in the art. Connected to the tail 29 is a vertically extending rod 30 which extends into the path of travel of the armature 31, adjustable by a screw 32, which coöperates with the poles of the magnet whose winding is 33. A spring 34 is connected at one end to the cam member or its extension 19, and at its other end to the lever 22, the spring being in tension when the parts are in circuit closing position.

Between the main contact terminals 2 and 3 is mounted a contact 35 adapted to reciprocate in the cylinder 36 in which is contained a spring forcing the contact 35 outwardly to engage the contact 37 carried by and in communication with the bridging member 4.

On the underside of the lever 22 are two downwardly projecting ears 38 in which is supported the horizontally extending pin 39 upon which pivots the head 40 carrying the downwardly screw-threaded extension 41 which engages in the interiorly screw-threaded sleeve 42, which may be thus adjusted upwardly and downwardly with respect to the pin 39 and may be locked in desired position by the nut 43. The lower end of the sleeve 42 is perforated to permit the free passage of the rod 44 which is provided with the head 45, between which and the bottom of the sleeve 42 is confined a resilient member such as a spring 46, thus allowing slight vertical play of the rod 44 with respect to the sleeve 42. The lower end of the rod 44 is screw-threaded into the member 47 forming the top of a clevis or bifurcated member whose limbs 48 extend on both sides of the arm 49, and carried between them is the horizontally disposed pin 50 having the ball-shaped enlargement 51. Above and below the ball 51 and screw-threaded in the arm 50 are two screws 52 and 53 having ball-shaped cavities engaging the ball 51, thus forming, in effect, a ball and socket connection between the rod 44 and the arm 49, thus dispensing with the necessity for accurate alinement of the breaker B with its motor driven actuator. The arm 49 is secured by bolts 54 to the worm wheel 55 secured upon the shaft 56 having bearings in the housing or bracket 57, which, in turn, is secured to the base 1.

Adapted to mesh with and to drive the worm wheel, or rather segment of the worm wheel, 55, is the worm 58 secured upon the shaft 59 connected by universal joint 60 to the substantially vertically disposed shaft 61 of the motor M, which is secured upon the base 1. In the housing or bracket 57 is a short slot 62 in which is guided a pin 63, secured upon the bearing 64 in which the shaft 59 bears. This construction permits the shaft 59 to move to the right or left, as viewed in Figs. 1 and 6, to throw the worm 58 into or out of mesh with the worm wheel segment 55. In Figs. 1 and 6 only one-half of the bearing 64 is shown, in section, the remainder of the shaft and the other half of the bearing being broken away for the sake of clearness of illustration.

Upon the pin 63, which, as aforesaid, is movable in the slot 62, is pivoted one end of the toggle link 65 whose other end is pivoted at 66 to the second toggle link 67 pivoted to the housing at 68.

Pivoted at 69 on the toggle link 67 is the armature 70 of an electro-magnet, secured upon the housing 57, whose winding is 71 and having the inner pole or core 72 with the surrounding iron jacket 73. The core 72 and jacket 73 are secured together by screws 74. Extending upwardly through the axis of the jacket 73 and core 72 is an adjusting screw 75 which supports at its top the block 76 movable vertically in the axial hole in the core 72. Engaging upon this block 76 and guided in the axial hole in the core 72 is a spring 77 whose upper end is inclosed in the shell 78 which is also pivoted at 69.

On the left side of the housing or bracket 57, as viewed in Fig. 2, is mounted the single acting motor control switch as illustrated in Fig. 3.

The shaft 56, upon which is mounted the worm wheel 55, extends outwardly beyond the housing or bracket 57 and there is secured thereon, by bolt 79, the hub 80 having a surface 81 rising therefrom at 80'. The roller 82 is pivoted upon plate 83 which, in turn, is pivoted to the plate 84 at 85. The roller 82 being actuated by the hub or member 80 causes the rotation of the plate 83 about its pivot 85. The plate 84 is secured upon the sheet or plate 86 of insulating material secured by screws 87 upon the side of the bracket 57. A post 88, upon the plate 83, has secured to it one end of a spring 89 whose other end is secured to the post 90 on the plate 84. The spring 89 is under tension and tends to draw the pin 88 toward the post 90, thus lifting the plate 83 against the stop 84' upon the plate 84.

Pivoted at 85, concentric with the pivoting of the plate 83 upon the plate 84, is the contact lever 91 carrying at its outer end the contact 92 adapted to engage with the contact 93 supported by spring 94 in electrical communication with the binding post 95. Secured on post 90 is a downwardly extending blade spring 96 carrying at its outer end the hook member 97 engaging with the extension 98 upon the lever 91 to lock the lever 91 in circuit closing position, as shown in Fig. 3, against the tension exerted by the spring 99, whose one end is connected to the post 88 on the plate 83 and whose other end is connected to the lever 91. The hook member 97, or the spring 96 carrying it, is adapted to be engaged by the surface 100 on the plate 83 to raise the hook 97 from engagement with the member 98 of the lever 91, thus releasing the lever 91 to the control of the spring 99 which snaps the lever downwardly to separate the contact 92 from the contact 93 to break the motor circuit. Electrical communication with contact 92 is maintained through the lever 91, its pivot upon the plate 84, and through the binding post 101 upon the plate 84.

On the right hand side of the bracket 57, as viewed in Fig. 2, is secured the switch shown in Fig. 5. Referring to Fig. 5, 102 is a sheet or plate of insulating material secured by screws 103 upon the side of the bracket 57. Mounted upon the plate 102 are the two contacts 104 and 105 provided with the binding posts 106 and 107, respectively. With the contacts 104 and 105 engage respectively the contacts 108 and 109 supported respectively by the blade springs 110 and 111, in electrical communication with each other, and supported between the stops or limit plates 112 and 113 upon the lever 114, the latter pivoted at 115 upon the plate 102. Upon the plate 113 is a contact 135 adapted to engage with the stationary contact 136 provided with the binding post 136'. A binding post 116 is mounted upon the lever 114 and affords electrical communication through said lever with both of the contacts 108 and 109. At the upper end of the lever 114 is formed a jaw or hook 117 within which engages a metallic bushing 118 surrounding the bushing of insulating material 119 which, in turn, is secured upon the pin 63 movable, as above described, in the slot 62, which slot extends also through the plate 102. Accordingly, as the toggle 65, 67 is collapsed or extended, the pin 63 moves toward the one end or the other of the slot 62, thus tilting the lever 114 upon its pivot 115, bringing the contacts 108 and 109 alternately into communication with stationary contacts 104 and 105 respectively, the disposition and arrangement being such that the contact 109 makes contact with the stationary contact 105 before contact 108 breaks contact with stationary contact 104; and contacts 135 and 136 make or break contact.

Referring now to Fig. 7, G is a generator or source of current, or other electrical device which is to be thrown into or out of electrical communication with the conductors or bus bars 120 and 121, according as the circuit breaker B is closed or open. The main contact terminal 2 of the breaker B is connected to the bus bar or conductor 121, while the main terminal 3 is connected to one terminal of the generator G, the other terminal thereof being connected to the conductor or bus bar 120. By way of example, bus bar 121 is assumed to be positive while bus bar 120 is assumed to be negative. From the reciprocating contact 35 a connection is made by conductor 122 with one terminal of the tripping coil 33 whose other terminal communicates through conductor 123 with the stationary contact 104 of the switch shown in Fig. 5. This contact 104 is in communication through conductor 124 with a switch arm 125 which may be at any point more or less remote from the circuit breaker B and its motor operating mechanism. The switch lever 125 is adapted to communicate with any one of three contacts 126, 127 and 128. Contact 126 is in communication through conductor 129 with the positive side of the net work of which bus bar 121 is a part, while contact 128 is in communication through conductor 130 with the negative side of the net work of which the bus bar 120 is a part. The middle contact 127 is in communication through an indicating device, such as an incandescent lamp 131, with the contact 126. One terminal of the armature of the motor M is connected through the motor switch 92, 93 (shown in Fig. 3) to the conductor 120, while the other terminal of the armature connects to one terminal of the series field winding 132, the other terminal of the field winding being connected to the stationary contact 136 of the motor control switch, shown in Fig. 5. The winding 71 of the electro-magnet whose armature is 70 is connected in shunt to the field winding 132 and resistance R, whose one terminal connects with contact 136 and whose other terminal connects through conductor 133 with 108, 109, and 135. The contact 105 communicates through conductor 134 with the main terminal 3 of the circuit breaker B.

The operation is as follows: Assuming the parts in circuit closing position, as shown in Fig. 1 and Fig. 7, upon the occurrence of any predetermined or abnormal electrical condition, as for example, an overload, reversed energy flow, etc., the tail 29 of the latch actuating lever 28 is raised, thus causing the front end of the lever 28 to press downwardly upon the top of the latch 26 to unlock the breaker in the well known manner. When so unlocked, under the influence of gravity, and by the contraction of the spring 34, the cam member 17 rotates in a counter-clockwise direction about its pivot 18, allowing the arm 5 carrying the laminated bridging member 4 to swing outwardly away from the base 1, causing the bridging member 4 to separate from the main terminals 2 and 3 to break circuit, the metallic shunt contact piece later separating from the stationary metallic shunt contact piece 9, and finally, the shunt carbon 13 separating from the carbon 11, the final arcing taking place between these carbons in the well known manner. Accompanying this movement is a counter-clockwise movement of the lever 22 about its pivot 7, raising the rod 44, which, in turn, rotates the arm 49 and the attached worm wheel 55 in a counter-clockwise direction. With the breaker B in open position pursuant to the action thus described, the generator or device G is cut off from the bus bar or conductor 121. When it is desired to again close the breaker B, the operator at the breaker B may effect such closure by depressing the grip 23 upon the handle lever 22 which causes the link 24 to rotate the cam member 17 in a clockwise direction about its pivot 18, the cam surface 16 engaging the roller 15, thus forcing the laminated bridging member 4 into engagement with the terminal blocks 2 and 3. During this movement, the worm wheel 55 is again rotated to the position shown in Fig. 1, the worm wheel 55 and connected parts being free to move. Or, assuming the breaker to be in open position, the contact 92 has been brought into contact with 93, due to the action of the switch shown in Fig. 3, as hereinafter described, and the operator at the distant station observes, when the switch lever 125 is on contact 127, from the glowing of the lamp 131, that everything is in readiness for closing the breaker. He then moves the lever 125 onto contact 126, whereupon current will flow from the positive side of the net work through conductor 129, switch lever 125, conductor 124, contact 104, contact 108, conductor 133, through the winding 71 of the electro-magnet and motor field 132 and resistance R, through the armature of the motor M, through contacts 92 and 93 to the negative side of the net work. Immediately the motor M starts to rotate and to revolve the worm 58, which is thrown into mesh with the worm wheel segment 55 by the action of the electro-magnet in attracting its armature 70, in opposition to spring 77, extending the toggle 65, 67, shifting the shaft 59 to the right, as viewed in Fig. 1, the shaft being guided by the pin 63 in the slot 62, until the worm 58 meshes with the worm wheel segment 55. This position of the parts is shown in Fig. 6. The worm wheel is accordingly rotated in a clockwise direction, as viewed in Fig. 1, pulling down the rod 44 and the attached lever 22 until the parts are in full circuit closing position and the latch 26, spring pressed upwardly, locks the parts in circuit closing position as heretofore described. Upon the attraction of the armature 70 and the extension of the toggle 65, 67, the pin 63 also tilts the lever 114, of the switch shown in Fig. 5, upon its pivot 115, bringing the contact 109 into engagement with the contact 105 and contact 135 into engagement with contact 136, and slightly later the contact 108 separates from stationary contact 104. The effect of this is, as will appear from Fig. 7, to supply current to the magnet winding 71 and the motor M through the conductor 134 from the positive side of the generator or other device G, thus rendering the conductor 124 and switch lever 125 at the distant station unnecessary and incapable of stopping the closing operation, even though the lever 125 is moved off the contact 126. In other words, by this arrangement, after the motor has once been started, the closing movement continues independently of any control exercised by the distant switch lever 125. The engagement of contacts 135 and 136 short circuits the resistance R after the magnet winding 71 has brought the worm wheel into mesh. Bridging the winding 71 across the resistance R and the field winding 132 insures, at the very start, a larger current passing through the winding 71, thus giving it ample power to perform its work of bringing the worm and wheel into mesh. As the worm wheel segment 55 rotates, as described in the closing operation, the shaft 56 of the worm wheel 55 rotates member 80 which causes roller 82 to ride up on surface 81 and to rotate the plate 83 in a counter-clockwise direction, as viewed in Fig. 3. As this rotation of the plate 83 continues, the surface 100 on said plate raises the hook 97 to release the lever 91 which, then, under the action of the spring 99, separates the contact 92 from the contact 93, thus breaking the motor circuit as well as the circuit of the winding 71 of the electro-magnet. Upon the deënergization of the electro-magnet whose winding is 71, the spring 77 raises the armature 70 and collapses the toggle 65, 67, thus removing the worm 58 from mesh with the worm wheel segment 55. This outward movement from the worm 58 is accompanied by a tilting of the lever 114, of the switch shown in Fig. 5, so as to restore contact between 108 and the stationary contact 104 and rupturing the contact between 109 and the stationary contact 105, and separating contact 135 from contact 136. At the end of the closing movement as above described, the contact 92 is separated from the contact 93 in the motor control switch. These contacts remain so separated until the circuit breaker opens. When the breaker opens, the rod 44 is lifted and the worm wheel segment 55 is rotated in a counter-clockwise direction, as viewed in Fig. 1, the worm 58 being out of mesh. This movement of the worm wheel segment 55 causes the return of member 80 and roller 82 to the position shown in Fig. 3. As this return movement takes place the plate 83 is rotated in a clockwise direction upon its pivot 85 by the contraction of the spring 89. This movement of the plate 83 causes the post 88, secured thereto, to lift the contact carrying arm 91, in opposition to its spring 99, until the contact 92 again engages the contact 93 and the hook 97 again locks the contacts in circuit closing position. From this it follows that the motor circuit is interrupted immediately the circuit breaker is closed, and remains so interrupted until the circuit breaker opens, when the motor circuit is again restored for control from the distant switch 125, it being remembered that the opening of the circuit breaker is entirely independent of either actuation or control by the motor. Immediately the circuit breaker has opened, the contacts 92 and 93 reëngage each other, as stated. Immediately the motor is started by the distant switch 125, the contact 108 leaves contact 104 immediately after contact 109 has engaged the contact 105. Then, when the circuit closing movement has been completed, contacts 92 and 93 separate and contacts 105 and 109, and 135 and 136 separate and contacts 108 and 104 reëngage.

If the circuit breaker is in circuit closing position and it is desired to open the circuit breaker from the distant station, the operator moves the lever 125 onto contact 128, whereupon current will flow from the bridging member 4, through contact 37, contact 35, conductor 122, tripping coil 33, conductor 123, conductor 124, through switch lever 125, contact 128, and conductor 130 to the negative side of the net work. When the winding 33 is energized the armature 31 is attracted upwardly, as viewed in Fig. 1, raising the rod 30 and tilting the latch actuating lever 28 to depress the latch 26, thus unlocking the circuit breaker as previously described. As the circuit breaker opens, the contact 37 separates from contact 35 thus interrupting the circuit through winding 33 just traced.

What I claim is:

1. The combination with an electric switch, of a motor for closing the same, means for closing the circuit of said motor to start the same, automatic means for maintaining the motor circuit closed until said switch has been closed by said motor, and a snap switch for breaking the motor circuit when said switch is closed.

2. The combination with an electric switch, of a motor for closing the same, an operator's switch for closing the circuit of the motor to start the same, automatic means operative after said motor has started to maintain the motor circuit closed independently of said operator's switch, and a snap switch for breaking the motor circuit when said switch reaches closed position.

3. The combination with an electric switch, of a motor for closing the same, a connection between said motor and switch, an electrically controlled clutch between said motor and said connection, an operator's switch for closing the circuit of the motor to start the same, automatic means operative after said motor has started for maintaining said motor circuit closed independently of said operator's switch, and a snap switch for breaking the motor circuit and releasing said clutch when said switch is closed.

4. The combination with an electric switch, of a motor for closing the same, an electrically controlled clutch between said motor and switch, an operator's switch for closing the circuit of the motor to start the same, means actuated by said motor after starting for maintaining its circuit closed independently of said operator's switch, and a snap switch controlled by the connection between said motor and switch for breaking the motor circuit when said switch is closed.

5. The combination with an electric switch, of a worm gear for actuating the same, a worm for driving said gear, a motor for driving said worm, an electro-magnet for moving said worm into mesh with said gear, an operator's switch for closing the circuit of said magnet and said motor, whereby said worm is brought into mesh with said gear and motor started, means independent of said motor controlled by said operator's switch for opening said switch, and an automatic switch controlled by the movement of said switch for rupturing the circuit of said motor and electro-magnet at the end of the switch closing movement and for automatically restoring the circuit of said motor and magnet when said switch is opened.

6. The combination with an electric switch, of a worm gear for actuating the same, a worm for driving said gear, a motor for driving said worm, an electro-magnet for bringing said worm into mesh with said gear, an operator's switch for closing the circuit of said magnet and motor, automatic means for maintaining the circuit of said magnet and motor closed independently of said operator's switch, and an automatic switch controlled by the movement of said switch for opening the circuit of said magnet and said motor at the end of the switch closing movement and for restoring the circuit of said magnet and motor when said switch is opened.

7. The combination with an electric switch, of a motor for actuating the same, an operator's switch for controlling said motor, a worm and gear intervening between said motor and said switch, means for shifting said worm into and out of mesh with said gear, and a switch actuated by said worm shifting means for maintaining the circuit of said motor closed independently of said operator's switch.

8. The combination with an electric switch, of a motor for actuating the same, a worm and gear intervening between said motor and switch, means for throwing said worm into mesh with said gear and out of mesh when said motor stops, a motor circuit switch actuated by said motor to interrupt the circuit of said motor, and a connection from said switch to said motor circuit switch to restore the circuit of said motor upon the opening of said switch.

9. The combination with an electric switch, of a motor for actuating the same, a worm and gear intervening between said motor and switch, means for throwing said worm into mesh with said gear and out of mesh when said motor stops, a switch actuated by said worm actuating means for maintaining the motor circuit closed after it has been once closed, and a switch controlled by the opening movement of said switch for interrupting the motor circuit when said switch is closed.

10. The combination with a circuit breaker, of a trip coil therefor, a worm gear for actuating the movable member of said circuit breaker after it has been tripped, a motor, a worm driven by said motor and adapted to mesh with said gear to drive the same, a toggle connected to said worm, an electro-magnet for actuating said toggle to bring said worm into mesh with said gear, means operative after predetermined movement of said movable member of said circuit breaker for deënergizing said electro-magnet to disengage said worm from said gear, and means for energizing said trip coil to trip said circuit breaker when said worm is disengaged from said gear.

11. The combination with an electric switch, of a motor for closing the same, means for closing the circuit of said motor to start the same, automatic means for maintaining the motor circuit closed until said switch has been closed by said motor, a snap switch for breaking the motor circuit when said first named switch has been closed by said motor, said snap switch comprising a movable contact member, a latch and a spring therefor, and means movable with the movable member of said first named switch for controlling said latch.

12. The combination with a circuit breaker having a movable contact member, of a trip coil therefor, a motor, means for connecting said motor with said movable contact member comprising disengageable driving and driven members, an electro-magnet for bringing said driving and driven members into engagement with each other, and an operator's switch and connections allowing dis-simultaneous energization of said trip coil and said electro-magnet and preventing simultaneous energization of said trip coil and said electro-magnet.

13. The combination with a circuit breaker having a movable contact member, of a trip coil therefor, a motor, means for connecting said motor with said movable contact member comprising disengageable driving and driven members, an electro-magnet for bringing said driving and driven members into engagement with each other, a double throw operator's switch, a permanent connection between said operator's switch and said trip coil, and connections whereby said trip coil is energized in one position by said operator's switch and said electro-magnet is energized in the other position by said operator's switch.

14. The combination with a circuit breaker having a movable contact member, of a trip coil therefor, a motor, means for connecting said motor with said movable contact member comprising disengageable driving and driven members, an electro-magnet for bringing said driving and driven members into engagement with each other, a double throw operator's switch, a second double throw switch in the circuit of said electro-magnet, and a permanent connection between said operator's switch and said trip coil and a contact of said second double throw switch.

15. The combination with a circuit breaker having a movable contact member, of a trip coil therefor, a motor, means for connecting said motor with said movable contact member comprising disengageable driving and driven members, an electro-magnet for bringing said driving and driven members into engagement with each other, a double throw operator's switch, a second double throw switch in the circuit of said electro-magnet, a permanent connection between said operator's switch and said trip coil and a contact of said second double throw switch, said second double throw switch controlled by said electro-magnet.

16. The combination with a circuit breaker having a movable contact member, of a trip coil therefor, a motor, means for connecting said motor with said movable contact member comprising disengageable driving and driven members, an electro-magnet for bringing said driving and driven members into engagement with each other, a double throw operator's switch, a second double throw switch in the circuit of said electro-magnet, a permanent connection between said operator's switch and said trip coil and a contact of said second double throw switch, said motor controlled by said second double throw switch.

17. The combination with a circuit breaker having a movable contact member, of a trip coil therefor, a motor, means for connecting said motor with said movable contact member comprising disengageable driving and driven members, an electro-magnet for bringing said driving and driven members into engagement with each other, a double throw operator's switch, a second double throw switch in the circuit of said electro-magnet, a permanent connection between said operator's switch and said trip coil and a contact of said second double throw switch, said motor controlled by said second double throw switch, and a motor control switch for breaking the circuit of said motor after predetermined movement of said movable contact member of said circuit breaker.

18. The combination with a circuit breaker having a movable contact memof a trip coil therefor, a motor, means for connecting said motor with said movable contact member comprising disengageable driving and driven members, an electro-magnet for bringing said driving and driven members into engagement with each other, a double throw operator's switch, a second double throw switch in the circuit of said electro-magnet, a permanent connection between said operator's switch and said trip coil and a contact of said second double throw switch, said motor controlled by said second double throw switch, and a switch for breaking the circuit of said motor and said electro-magnet after predetermined movement of said movable contact member of said circuit breaker.

19. The combination with a circuit breaker having a movable contact member, of a trip coil therefor, a motor, means for connecting said motor with said movable contact member comprising disengageable driving and driven members, an electro-magnet for bringing said driving and driven members into engagement with each other, a double throw operator's switch, a second double throw switch in the circuit of said electro-magnet, a permanent connection between said operator's switch and said trip coil and a contact of said second double throw switch, said second double throw switch controlled by said electro-magnet, the circuit of said motor controlled by said second double throw switch.

20. The combination with a circuit breaker having a movable contact member, of a trip coil therefor, a motor, means for connecting said motor with said movable contact member comprising disengageable driving and driven members, an electro-magnet for bringing said driving and driven members into engagement with each other, a double throw operator's switch, a second double throw switch in the circuit of said electro-magnet, a permanent connection between said operator's switch and said trip coil and a contact of said second double throw switch, said second double throw switch controlled by said electro-magnet, and a motor control switch for breaking the circuit of said motor after predetermined movement of said contact member of said circuit breaker.

21. The combination with a circuit breaker having a movable contact member, of a trip coil therefor, a motor, means for connecting said motor with said movable contact member comprising disengageable driving and driven members, an electro-magnet for bringing said driving and driven members into engagement with each other, a double throw operator's switch, a second double throw switch in the circuit of said electro-magnet, a permanent connection between said operator's switch and said trip coil and a contact of said second double throw switch, said second double throw switch controlled by said electro-magnet, and a switch controlling the circuit of said electro-magnet and said motor actuated after predetermined movement of said movable contact member of said circuit breaker.

22. The combination with a circuit breaker having a movable contact member, of a trip coil therefor, a motor for driving said movable contact member, a double throw operator's switch, a permanent connection between said operator's switch and one terminal of said trip coil, means for connecting one terminal of said motor with said operator's switch, connections from the remaining terminals of said trip coil and said motor to conductors of opposite polarities, and conductors of opposite polarities engaged by said operator's switch in its different positions.

23. The combination with a circuit breaker having a movable contact member, of a trip coil therefor, a motor for driving said movable contact member, a double throw operator's switch, a permanent connection between said operator's switch and one terminal of said trip coil, the remaining terminal of said trip coil and a terminal of said motor connected to conductors of opposite polarities, and a second switch having a permanent connection with said operator's switch and connected with the remaining terminal of said motor.

24. The combination with a circuit breaker having a movable contact member, of a trip coil therefor, a motor for driving said movable contact member, a double throw operator's switch, a permanent connection between said operator's switch and one terminal of said trip coil, the remaining terminal of said trip coil and a terminal of said motor connected to conductors of opposite polarities, a second switch having a permanent connection with said operator's switch and connected with the remaining terminal of said motor, and a second contact of said second switch connected with the conductor to which said remaining terminal of said trip coil is connected.

25. The combination with a circuit breaker having a movable contact member, of a trip coil therefor, a motor for driving said movable contact member, a double throw operator's switch, a permanent connection between said operator's switch and one terminal of said trip coil, the remaining terminal of said trip coil and a terminal of said motor connected to conductors of opposite polarities, a second switch having a permanent connection with said operator's switch and connected with the remaining terminal of said motor, and an electro-magnet controlled by and controlling said second switch.

26. The combination with a circuit breaker having a movable contact member, of a trip coil therefor, a motor for driving said movable contact member, a double throw operator's switch, a permanent connection between said operator's switch and one terminal of said trip coil, the remaining terminal of said trip coil and a terminal of said motor connected to conductors of opposite polarities, a second switch having a permanent connection with said operator's switch and connected with the remaining terminal of said motor, and a motor control switch for breaking the circuit of said motor after predetermined movement of said movable contact member of said circuit breaker.

27. The combination with a circuit breaker having a movable contact member, of a trip coil therefor, a motor for driving said movable contact member, a double throw operator's switch, a permanent connection between said operator's switch and one terminal of said trip coil, the remaining terminal of said trip coil and a terminal of said motor connected to conductors of opposite polarities, a second switch having a permanent connection with said operator's switch and connected with the remaining terminal of said motor, an electro-magnet controlled by and controlling said second switch, and a third switch actuated after predetermined movement of said movable contact member of said circuit breaker controlling said motor and said electro-magnet.

28. The combination with a circuit breaker having a movable contact member, of a trip coil therefor, a motor for driving said movable contact member, a double throw operator's switch, a permanent connection between said operator's switch and one terminal of said trip coil, the remaining terminal of said trip coil and a terminal of said motor connected to conductors of opposite polarities, a second switch having a permanent connection with said operator's switch and connected with the remaining terminal of said motor, a second contact of said second switch connected with the conductor to which said remaining terminal of said trip coil is connected, and an electro-magnet in the circuit of said second switch for moving the same into engagement with its said second contact.

29. The combination with a circuit breaker having a movable contact member, of a trip coil therefor, a motor for driving said movable contact member, a double throw operator's switch, a permanent connection between said operator's switch and one terminal of said trip coil, the remaining terminal of said trip coil and a terminal of said motor connected to conductors of opposite polarities, a second switch having a permanent connection with said operator's switch and connected with the remaining terminal of said motor, and a second contact of said second switch connected with the conductor to which said remaining terminal of said trip coil is connected, said motor controlled by said second switch in both its positions.

30. The combination with a circuit breaker having a movable contact member, of a trip coil therefor, a motor for driving said movable contact member, a double throw operator's switch, a permanent connection between said operator's switch and one terminal of said trip coil, the remaining terminal of said trip coil and a terminal of said motor connected to conductors of opposite polarities, a second switch having a permanent connection with said operator's switch and connected with the remaining terminal of said motor, a second contact of said second switch connected with the conductor to which said remaining terminal of said trip coil is connected, and an electro-magnet in the circuit of said second switch for moving the same into engagement with its said second contact, said motor controlled by said switch in both its said positions.

31. The combination with a main switch, of a motor for actuating the same, a switch controlling said motor for starting the same, and a double throw switch automatically maintaining the circuit of said motor closed after it has once been closed by said control switch, said double throw switch in one position connected through said control switch with a conductor and in another position connected independently of said control switch with another conductor of the same polarity as said first named conductor.

32. The combination with a main switch, of a motor for actuating the same, a switch controlling said motor for starting the same, and a double throw switch automatically maintaining the circuit of said motor closed after it has once been closed by said control switch, said double throw switch in one position connecting said motor with said control switch and in the other position with a conductor independent of control by said control switch.

33. The combination with a main switch, of a motor for actuating the same, a switch controlling said motor for starting the same and adapted to connect with a conductor, a double throw switch automatically maintaining the circiut of said motor closed after it has once been closed by said control switch, a trip coil for said main switch, said trip coil and a contact of said double throw switch in permanent connection with said control switch, and a second contact of said double throw switch in connection with a second conductor independent of control by said control switch, and of polarity similar to that of said first named conductor.

34. The combination with a main switch, of a motor for actuating the same, a switch controlling said motor for starting the same, a double throw switch which in one position is in series with said motor control switch in starting said motor, means actuating said double throw switch to move the same to its other position when said motor is started, said double throw switch in its said second position maintaining the circuit of said motor closed independently of said motor control switch.

35. The combination with a main switch, of a motor for actuating the same, a switch controlling said motor for starting the same, a double throw switch automatically maintaining the circuit of said motor closed after it has once been closed by said control switch, said double throw switch in one position connecting said motor through said control switch with a conductor and in the other position with another conductor independent of control by said control switch, and of polarity similar to that of said first named conductor, and a switch automatically rupturing the circuit of said motor after predetermined movement of said main switch.

36. The combination with a main switch, of a motor for actuating the same, a switch controlling said motor for starting the same and adapted to connect with a conductor, a double throw switch automatically maintaining the circuit of said motor closed after it has once been closed by said control switch, a trip coil for said main switch, said trip coil and a contact of said double throw switch in permanent connection with said control switch, and a second contact of said double throw switch in connection with a second conductor independent of control by said control switch, and of a polarity similar to that of said first named conductor, and a switch automatically rupturing the circuit of said motor after predetermined movement of said main switch.

37. The combination with a main switch, of a motor for actuating the same, a switch controlling said motor for starting the same, and a double throw switch automatically maintaining the circuit of said motor closed after it has once been closed by said control switch, a resistance in the circuit of said motor, said double throw switch in one position cutting out said resistance.

38. The combination with a main switch, of a motor for actuating the same, a switch controlling said motor for starting the same and adapted to connect with a conductor, a double throw switch automatically maintaining the circuit of said motor closed after it has been closed by said control switch, a contact of said double throw switch connected with said control switch, and another contact of said double throw switch connected with a second conductor independent of control by said control switch and of polarity similar to that of said first named conductor, said control switch making contact with said second contact before separating from said first contact.

39. The combination with a main switch, of a motor for actuating the same, a switch controlling said motor for starting the same, a double throw switch which in one position is in series with said motor control switch in starting said motor, an electro-magnet controlled by said double throw switch and actuating the same to its other position, said double throw switch in its said other position maintaining the circuit of said motor closed independently of said motor control switch.

40. The combination with a main switch, of a motor for actuating the same, a switch controlling said motor for starting the same, a double throw switch automatically maintaining the circuit of said motor closed after it has once been closed by said control switch, an electro-magnet controlling and controlled by said double throw switch, and a mechanical connection between said motor and said main switch controlled by said electro-magnet.

41. The combination with a main switch, of a motor for actuating the same, means for connecting said motor with said main switch comprising disengageable driving and driven members, an operator's switch controlling said motor, and a switch actuated when said driven member is brought into engagement with said driving member for automatically maintaining the circuit of said motor closed independently of said operator's switch.

42. The combination with a main switch, of a motor for actuating the same, means for connecting said motor with said main switch comprising disengageable driving and driven members, an operator's switch controlling said motor, a switch actuated when said driven member is brought into engagement with said driving member for automatically maintaining the circuit of said motor closed indepenedntly of said operator's switch, a resistance in the circuit of said motor, and means for cutting out said resistance when said driving and driven members are brought into engagement.

43. The combination with a main switch, of a motor for actuating the same, a motor control switch in one position closing circuit through said motor and in its other position interrupting the circuit of said motor, said switch comprising a movable contact member and a latch for locking the same in motor circuit closing position, and means unlocking said control switch after predetermined movement of said main switch for breaking the circuit of said motor to stop the same.

44. The combination with a main switch, of a motor for moving the same to normal position, the movement of said main switch to abnormal position being independent of actuation or control by said motor, a motor control switch comprising a movable contact member and a latch for restraining the same in closed position, means for actuating said latch when said main switch reaches normal position, said main switch in moving to abnormal position reclosing and latching said motor control switch.

In testimony whereof I have hereunto affixed my signature in the presence of the two subscribing witnesses.

WILLIAM M. SCOTT.

Witnesses:
ELEANOR T. McCALL,
ANNA E. STEINBOCK.